United States Patent
Bagnato, III

[11] Patent Number: 5,959,791
[45] Date of Patent: Sep. 28, 1999

[54] DEVICE FOR VIEWING THE SOLES OF FEET

[76] Inventor: Ralph J. Bagnato, III, 12 N. Harding Ave., Margate City, N.J. 08402

[21] Appl. No.: 08/988,647

[22] Filed: Dec. 11, 1997

[51] Int. Cl.[6] .............................. G02B 7/182; A47F 1/14
[52] U.S. Cl. .......................... 359/872; 248/466; 248/488
[58] Field of Search ................................... 359/871, 872, 359/881; 248/466, 477, 488, 346.06; 33/3 R

[56] References Cited

U.S. PATENT DOCUMENTS

| | | | |
|---|---|---|---|
| 1,152,156 | 8/1915 | Falk | 359/871 |
| 1,492,324 | 4/1924 | Hoover | 312/114 |
| 1,692,943 | 11/1928 | Lelyveld | 359/872 |
| 1,743,469 | 1/1930 | May | 359/872 |
| 5,400,183 | 3/1995 | Rosser | 359/872 |

*Primary Examiner*—Thong Nguyen
*Assistant Examiner*—Mark A. Robinson

[57] ABSTRACT

A new device for viewing the soles of feet for observing the plantar aspect (sole portion) of both feet during normal weight bearing while standing. The inventive device includes a box member with a mirror member within its interior space. The box member has a substantially transparent top panel on which a person's feet are placed on and a front opening into the interior space through which the upper reflective surface is viewable so that the reflected image of the soles of the feet may be seen and examined.

16 Claims, 2 Drawing Sheets

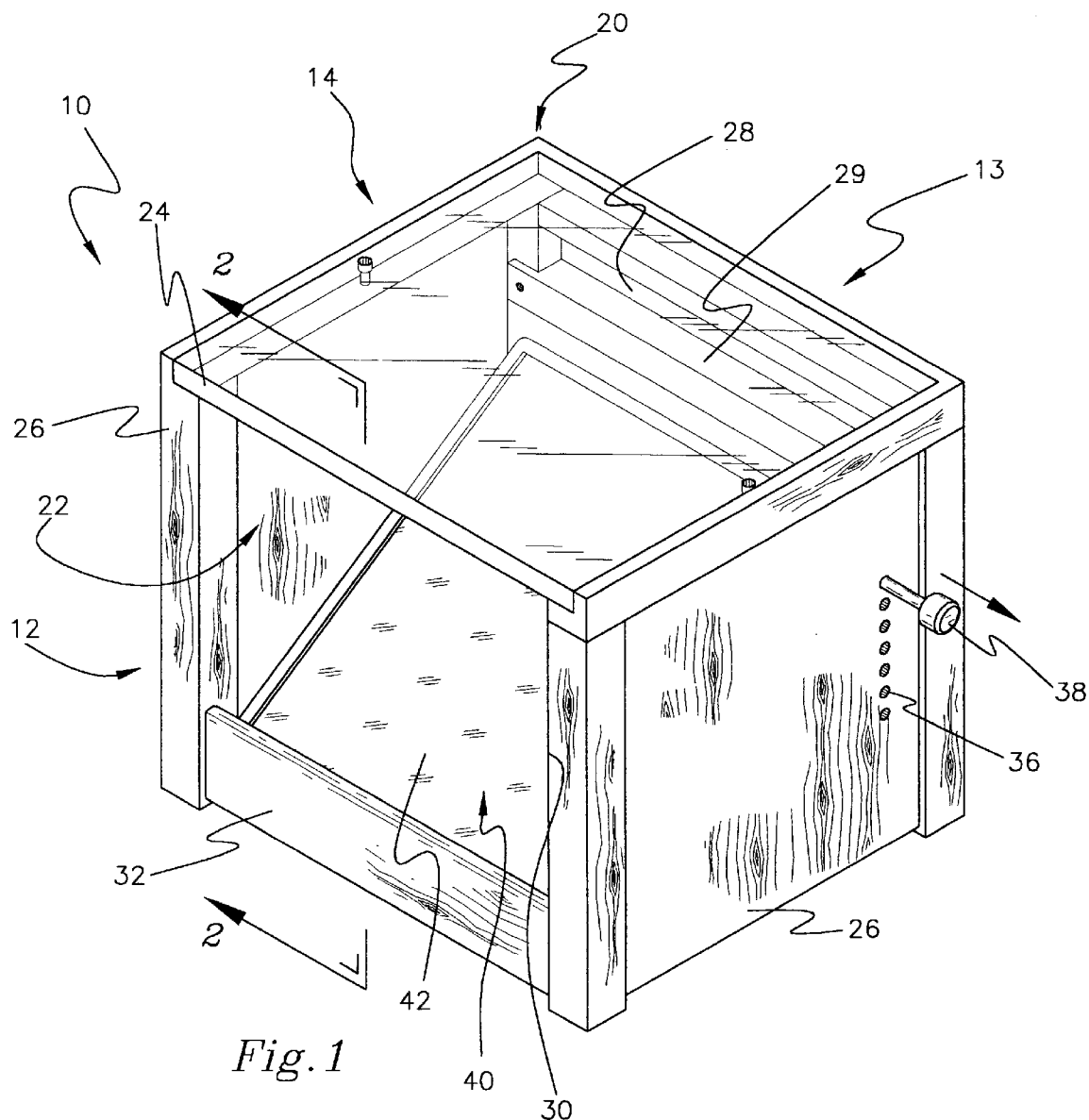

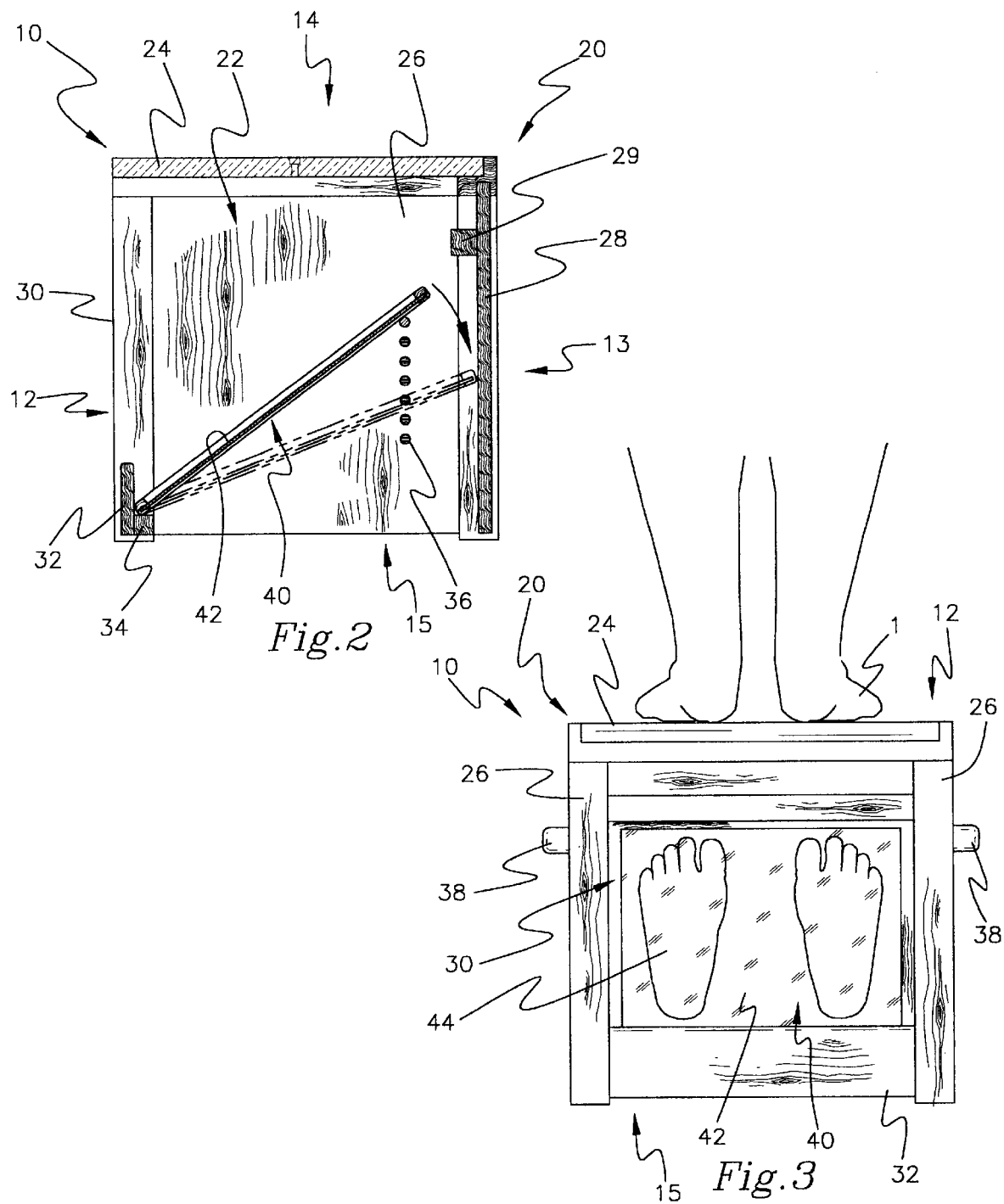

DEVICE FOR VIEWING THE SOLES OF FEET

BACKGROUND OF THE INVENTION

1. Field of the Invention

The present invention relates to feet viewing devices and more particularly pertains to a new device for viewing the soles of feet for observing the plantar aspect (sole portion) of both feet during normal weight bearing while standing.

2. Description of the Prior Art

The use of feet viewing devices is known in the prior art. More specifically, feet viewing devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art feet viewing devices include U.S. Pat. No. 4,395,826; U.S. Pat. No. 5,358,251; U.S. Pat. No. 5,227,922; U.S. Pat. No. 3,936,668; U.S. Pat. No. 4,110,011; and U.S. Pat. No. Des. 253,414.

While these devices fulfill their respective, particular objectives and requirements, the aforementioned patents do not disclose a new device for viewing the soles of feet. The inventive device includes a box member with a mirror member within its interior space. The box member has a substantially transparent top panel on which a person's feet are placed on and a front opening into the interior space through which the upper reflective surface is viewable so that the reflected image of the soles of the feet may be seen and examined.

In these respects, the device for viewing the soles of feet according to the present invention substantially departs from the conventional concepts and designs of the prior art, and in so doing provides an apparatus primarily developed for the purpose of observing the plantar aspect (sole portion) of both feet during normal weight bearing while standing.

SUMMARY OF THE INVENTION

In view of the foregoing disadvantages inherent in the known types of feet viewing devices now present in the prior art, the present invention provides a new device for viewing the soles of feet construction wherein the same can be utilized for observing the plantar aspect (sole portion) of both feet during normal weight bearing while standing.

The general purpose of the present invention, which will be described subsequently in greater detail, is to provide a new device for viewing the soles of feet apparatus and method which has many of the advantages of the feet viewing devices mentioned heretofore and many novel features that result in a new device for viewing the soles of feet which is not anticipated, rendered obvious, suggested, or even implied by any of the prior art feet viewing devices, either alone or in any combination thereof.

To attain this, the present invention generally comprises a box member with a mirror member within its interior space. The box member has a substantially transparent top panel on which a person's feet are placed on and a front opening into the interior space through which the upper reflective surface is viewable so that the reflected image of the soles of the feet may be seen and examined.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new device for viewing the soles of feet apparatus and method which has many of the advantages of the feet viewing devices mentioned heretofore and many novel features that result in a new device for viewing the soles of feet which is not anticipated, rendered obvious, suggested, or even implied by any of the prior art feet viewing devices, either alone or in any combination thereof.

It is another object of the present invention to provide a new device for viewing the soles of feet which may be easily and efficiently manufactured and marketed.

It is a further object of the present invention to provide a new device for viewing the soles of feet which is of a durable and reliable construction.

An even further object of the present invention is to provide a new device for viewing the soles of feet which is susceptible of a low cost of manufacture with regard to both materials and labor, and which accordingly is then susceptible of low prices of sale to the consuming public, thereby making such device for viewing the soles of feet economically available to the buying public.

Still yet another object of the present invention is to provide a new device for viewing the soles of feet which provides in the apparatuses and methods of the prior art some of the advantages thereof, while simultaneously overcoming some of the disadvantages normally associated therewith.

Still another object of the present invention is to provide a new device for viewing the soles of feet for observing the plantar aspect (sole portion) of both feet during normal weight bearing while standing.

Yet another object of the present invention is to provide a new device for viewing the soles of feet which includes a box member with a mirror member within its interior space.

The box member has a substantially transparent top panel on which a person's feet are placed on and a front opening into the interior space through which the upper reflective surface is viewable so that the reflected image of the soles of the feet may be seen and examined.

Still yet another object of the present invention is to provide a new device for viewing the soles of feet that allows a health care professional to easily view the soles of feet for examination.

Even still another object of the present invention is to provide a new device for viewing the soles of feet that helps reveal any abnormalities of the plantar aspect of a person's feet.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new device for viewing the soles of feet according to the present invention.

FIG. 2 is a schematic sectional view of the present invention taken from line 2—2 of FIG. 1.

FIG. 3 is a schematic side view of the present invention in use with a person standing on the top panel.

DESCRIPTION OF THE PREFERRED EMBODIMENT

With reference now to the drawings, and in particular to FIGS. 1 through 3 thereof, a new device for viewing the soles of feet embodying the principles and concepts of the present invention and generally designated by the reference numeral 10 will be described.

As best illustrated in FIGS. 1 through 3, the device for viewing the soles of feet 10 generally comprises a box member 20 with a mirror member 40 within its interior space 22. The box member 20 has a substantially transparent top panel 24 on which a person's feet are placed on and a front opening 30 into the interior space 22 through which the upper reflective surface 42 is viewable so that the reflected image 44 of the soles of the feet 1 may be seen and examined.

The box member 20 is generally rectangular in shape having a front 12, back 13, top 14 and bottom 15. The box member 20 is formed to include a rectangular, substantially planar and substantially transparent top panel 24 that is designed for the placing and supporting of feet 1 thereupon. The box member 20 also formed to include a pair of opposite rectangular side panels 26, and a rectangular back panel 28. Together, the top panel 24, the side panels 26, and the back panel 28 define the interior space 22 of the box member 20. The side panels 26 are also spaced apart to define a front opening 30 into the interior space 30 to permit viewing into the interior space 30.

Preferably, the box member 20 further includes an elongate rectangular front brace 32 extending between the side panels 26 and spaced apart from the back panel 28 for adding extra support to the box member 20. Ideally, the front brace has an elongate mounting flange portion 34 extending towards the back panel 28. Optionally, the back panel 28 includes a elongate back brace 29 extending between the side panels 26 for providing additional support to the box member 20.

In each the side panel 26, there are provided a plurality of adjustment holes 36 that are substantially coaxial with the adjustment holes 36 in the other side panel 26. The adjustment holes 36 permit removable insertion of a mounting peg 38 through each of the side panels 26 into the interior space 22 of the box member 20. With this arrangement, the adjustment holes 36 permit adjustment of the angle position of the upper reflective surface 42 of the mirror member 40 with respect to the top panel 24.

The mirror member 40 is disposed within the interior space 22 of the box member 20 so that the mirror member extends between the front 12 of the box member 20 and the back panel 28 with its substantially planar upper reflective surface 42 facing the top panel 24. This arrangement of the mirror member 40 and the box member 20 permits viewing of the upper reflective surface 42 through the front 12 of the box member 20 so that the reflective image 44 of an object, such as the soles of feet, resting on the top panel 24 may be observed. In the preferred embodiment of the invention, as shown in FIG. 2, a portion of the mirror member 40 is rested on the mounting pegs 38 while another portion of the mirror member 40 is rested on the mounting flange portion 34 of the front brace 32.

In use, feet 1 of a person are placed on the top panel 24 with the person in a standing position on the transparent top panel 24 so that the full normal weight bearing is applied to the soles of the feet 1. The mirror member 40 may be positioned to adjust the angle of the upper reflective surface 42 of the mirror member 40 with respect to the top panel 24 so that a person may view the image 44 reflected by the reflective upper surface 42 of the mirror member 40 through the front 12 of the box member 20. Preferably, the adjusting of the mirror member 40 is performed by removing the mounting pegs 38 from the adjustment holes 36 and then reinserting each of the mounting pegs 38 into another the adjustment hole 36 on each side panel 20 and then resting the mirror member 40 on the mounting pegs 38 to permit viewing of the image 44 at a different angle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for viewing the soles of feet, comprising:
   a box member having a front, back, top and bottom, said box member being formed to include a substantially transparent top panel, a pair of opposite side panels, and a back panel, said top panel, said side panels, and said back panel defining an interior space therebetween, said side panels being spaced apart to define a front opening into said interior space;
   each said side panel having an adjustment hole extending therethrough, said adjustment hole of one side panel being substantially coaxial with said adjustment hole of the other said side panel;
   a pair of mounting pegs, each said pegs being removably insertable through said adjustment holes of said side panels, one said mounting peg being inserted through said adjustment hole of one said side panel and extending into said interior space of said box member, the other said mounting peg being inserted through said adjustment hole of the other of said side panels and extending into said interior space of said box member; and
   a mirror member having a upper reflective surface, said mirror member being disposed within said interior space of said box member, said mirror member being extended between said front of said box member and said back panel, said upper reflective surface facing said top panel, said upper reflective surface being viewable through said front of said box member, a portion of said mirror member being rested on said mounting pegs;
   an elongate front brace being extended between said side panels, said front brace being spaced apart from said back panel, wherein an other portion of said mirror member being rested on said front brace.

2. The device of claim 1, wherein said box member is rectangular, and wherein top panel, said side panels, said back panel, and said mirror member are rectangular.

3. The device of claim 4, wherein said top panel is substantially planar.

4. The device of claim 1, wherein said upper reflective surface of said mirror member is substantially planar.

5. The device of claim 1, wherein said front brace has a mounting flange portion, said mounting flange portion being extended towards said back panel, and wherein said other portion of said mirror member being rested on said mounting flange portion of said front brace.

6. The device of claim 1, wherein each said side panel has a plurality of adjustment holes extending therethrough, said adjustment holes of one side panel being substantially coaxial with said adjustment holes of the other said side panel, wherein each said pegs is removably insertable through said adjustment holes of said side panels, one said mounting peg being inserted through a said adjustment hole of one said side panel and extending into said interior space of said box member, the other said mounting peg being inserted through a said adjustment hole of the other of said side panels and extending into said interior space of said box member, and wherein said adjustment holes are for permitting adjustment of the position of upper reflective surface of said mirror member with respect to said top panel.

7. The device of claim 1, wherein said back panel has a elongate back brace being extended between said side panels.

8. A device for viewing the soles of feet, comprising:
   a rectangular box member having a front, back, top and bottom, said box member being formed to include a rectangular substantially planar and substantially transparent top panel, a pair of opposite rectangular side panels, and a rectangular back panel, said top panel, said side panels, and said back panel defining an interior space therebetween, said side panels being spaced apart to define a front opening into said interior space;
   an elongate rectangular front brace having a mounting flange portion, said front brace being extended between said side panels, said front brace being spaced apart from said back panel, said mounting flange portion being extended towards said back panel;
   each said side panel having a plurality of adjustment holes extending therethrough, said adjustment holes of one side panel being substantially coaxial with said adjustment holes of the other said side panel;
   a pair of mounting pegs, each said pegs being removably insertable through said adjustment holes of said side panels, one said mounting peg being inserted through a said adjustment hole of one said side panel and extending into said interior space of said box member, the other said mounting peg being inserted through a said adjustment hole of the other of said side panels and extending into said interior space of said box member;
   a rectangular mirror member having a substantially planar upper reflective surface, said mirror member being disposed within said interior space of said box member, said mirror member being extended between said front of said box member and said back panel, said upper reflective surface facing said top panel, said upper reflective surface being viewable through said front of said box member, a portion of said mirror member being rested on said mounting pegs, another portion of said mirror member being rested on said mounting flange portion of said front brace;
   said adjustment holes being for permitting adjustment of the position of upper reflective surface of said mirror member with respect to said top panel;
   said back panel having a elongate back brace being extended between said side panels.

9. A method for viewing the soles of feet, comprising the steps of:
   providing a device for viewing the soles of feet, comprising:
      a rectangular box member having a front, back, top and bottom, said box member being formed to include a rectangular substantially planar and substantially transparent top panel, a pair of opposite rectangular side panels, and a rectangular back panel, said top panel, said side panels, and said back panel defining an interior space therebetween, said side panels being spaced apart to define a front opening into said interior space;
      an elongate rectangular front brace having a mounting flange portion, said front brace being extended between said side panels, said front brace being spaced apart from said back panel, said mounting flange portion being extended towards said back panel;
      each said side panel having a plurality of adjustment holes extending therethrough, said adjustment holes of one side panel being substantially coaxial with said adjustment holes of the other said side panel;
      a pair of mounting pegs, each said pegs being removably insertable through said adjustment holes of said side panels, one said mounting peg being inserted through a said adjustment hole of one said side panel and extending into said interior space of said box member, the other said mounting peg being inserted through a said adjustment hole of the other of said side panels and extending into said interior space of said box member;

a rectangular mirror member having a substantially planar upper reflective surface, said mirror member being disposed within said interior space of said box member, said mirror member being extended between said front of said box member and said back panel, said upper reflective surface facing said top panel, said upper reflective surface being viewable through said front of said box member, a portion of said mirror member being rested on said mounting pegs, another portion of said mirror member being rested on said mounting flange portion of said front brace;

said adjustment holes being for permitting adjustment of the position of upper reflective surface of said mirror member with respect to said top panel;

said back panel having a elongate back brace being extended between said side panels;

placing feet on said top panel;

standing on said transparent top panel;

adjusting the position of a portion of said mirror member to adjust the angle of said upper reflective surface of said mirror member with respect to said top panel; and viewing the image reflected by said reflective upper surface of said mirror member through said front of said box member.

10. The method of claim 9, wherein the step of adjusting the position of a portion of said mirror member to adjust the angle of said upper reflective surface of said mirror member with respect to said top panel further comprises the steps of:

removing said mounting pegs from said adjustment holes;

inserting each said mounting pegs into another said adjustment hole on each side panel; and resting said other portion of mirror member on said mounting pegs.

11. A device for viewing the soles of feet, comprising:

a box member having a front, back, top and bottom, said box member being formed to include a substantially transparent top panel, a pair of opposite side panels, and a back panel, said top panel, said side panels, and said back panel defining an interior space therebetween, said side panels being spaced apart to define a front opening into said interior space;

each said side panel having an adjustment hole extending therethrough, said adjustment hole of one side panel being substantially coaxial with said adjustment hole of the other said side panel;

a pair of mounting pegs, each said pegs being removably insertable through said adjustment holes of said side panels, one said mounting peg being inserted through said adjustment hole of one said side panel and extending into said interior space of said box member, the other said mounting peg being inserted through said adjustment hole of the other of said side panels and extending into said interior space of said box member; and a mirror member having a upper reflective surface, said mirror member being disposed within said interior space of said box member, said mirror member being extended between said front of said box member and said back panel, said upper reflective surface facing said top panel, said upper reflective surface being viewable through said front of said box member, a portion of said mirror member being rested on said mounting pegs;

wherein each said side panel has a plurality of adjustment holes extending therethrough, said adjustment holes of one side panel being substantially coaxial with said adjustment holes of the other said side panel, wherein each said pegs is removably insertable through said adjustment holes of said side panels, one said mounting peg being inserted through a said adjustment hole of one said side panel and extending into said interior space of said box member, the other said mounting peg being inserted through a said adjustment hole of the other of said side panels and extending into said interior space of said box member, and wherein said adjustment holes are for permitting adjustment of the position of upper reflective surface of said mirror member with respect to said top panel.

12. The device of claim 11, wherein said box member is rectangular, and wherein top panel, said side panels, said back panel, and said mirror member are rectangular.

13. The device of claim 11, wherein said top panel is substantially planar.

14. The device of claim 11, wherein said upper reflective surface of said mirror member is substantially planar.

15. The device of claim 11, further comprising an elongate front brace being extended between said side panels, said front brace being spaced apart from said back panel, wherein an other portion of said mirror member being rested on said front brace, wherein said front brace has a mounting flange portion, said mounting flange portion being extended towards said back panel, and wherein said other portion of said mirror member being rested on said mounting flange portion of said front brace.

16. The device of claim 11, wherein said back panel has a elongate back brace being extended between said side panels.

* * * * *